US005137593A

United States Patent [19]

Walter

[11] Patent Number: 5,137,593

[45] Date of Patent: Aug. 11, 1992

[54] METHOD OF ASSEMBLING AND ADHERING SHEETS TOGETHER

[75] Inventor: Bernd H. Walter, Naples, Fla.

[73] Assignee: GBR Systems Corporation, Naples, Fla.

[21] Appl. No.: 541,031

[22] Filed: Jun. 7, 1990

[51] Int. Cl.[5] ............................ B42C 1/00; B32B 7/14

[52] U.S. Cl. ....................................... 156/291; 156/60; 156/290; 156/908; 412/6; 412/37

[58] Field of Search ................. 156/60, 290, 291, 295, 156/299, 442.1, 908; 412/8, 6, 37; 270/1.1, 58; 281/51; 282/DIG. 2

[56] References Cited

U.S. PATENT DOCUMENTS

| | | | |
|---|---|---|---|
| 2,782,756 | 2/1957 | Hunt | 412/37 X |
| 2,806,443 | 9/1957 | Horn et al. | 412/37 X |
| 4,511,297 | 4/1985 | Wilson et al. | 412/8 |
| 4,701,233 | 10/1987 | Beck et al. | 156/443 X |
| 4,799,989 | 1/1989 | Marzullo | 156/442.1 |

FOREIGN PATENT DOCUMENTS

| | | | |
|---|---|---|---|
| 1271368 | 10/1989 | Japan | 412/37 |

*Primary Examiner*—Jeff H. Aftergut
*Attorney, Agent, or Firm*—Stoll, Previto & Hoffman

[57] ABSTRACT

A mechanism and method for applying adhesive to a sheet at an adhesive applying station from a mechanism adjacent the adhesive applying station for applying adhesive. A sheet support mechanism is provided adjacent the adhesive applying station. A moving mechanism is provided for moving a portion of a sheet in one direction relative to the sheet support mechanism from an initial position to a position adjacent the adhesive applying mechanism in order for adhesive to be deposited on the sheet. A mechanism is also provided for moving the portion of the sheet with the adhesive thereon away from the adhesive applying mechanism in an opposite direction beyond the said initial position.

2 Claims, 1 Drawing Sheet

METHOD OF ASSEMBLING AND ADHERING SHEETS TOGETHER

BACKGROUND

The present invention relates to a mechanism for assembling a plurality of sheets into booklets or similar articles (such as travelers checks, coupon books, checkbooks, or other documents) and more particularly relates to a mechanism for assembling individual sheets together and adhering the margins of the sheets to each other to form the booklets.

It has been difficult to automatically assemble such booklets with current high speed document assembly machines. Difficulties have arisen because the individual sheets must have glue applied to each edge thereof so that when feeding large numbers of sheets at high speeds the application of glue to each individual sheet causes difficulties with keeping the glue on each sheet.

Current machines do not have the ability for high speed production of such booklets. To form the booklets, it is necessary to have adhesive applied to the individual sheets at high speeds and current machines are not capable of doing this. Furthermore, any attempts to prepare such booklets at high speeds result in glue being smeared to other sheets or to other parts of the mechanism.

OBJECTS

The present invention overcomes these drawbacks and has for one of its objects the provision of an improved mechanism for assembling and adhering a plurality of sheets together to form a booklet or similar article.

Another object of the present invention is the provision of an improved mechanism for forming booklets or similar articles in which each sheet has adhesive applied to it individually.

Another object of the present invention is the provision of an improved mechanism for forming booklets or similar articles in which the danger of glue being smeared to other sheets or to other parts of the mechanism is eliminated.

Another object of the present invention is the provision of an improved mechanism for producing booklets or similar articles in which the adhesive is confined to the sheet to which it is applied.

Another object of the present invention is the provision of an improved mechanism for forming booklets or similar articles which operates at very high speeds.

Other and further objects of the invention will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification, wherein.

DESCRIPTION

Figure 1:
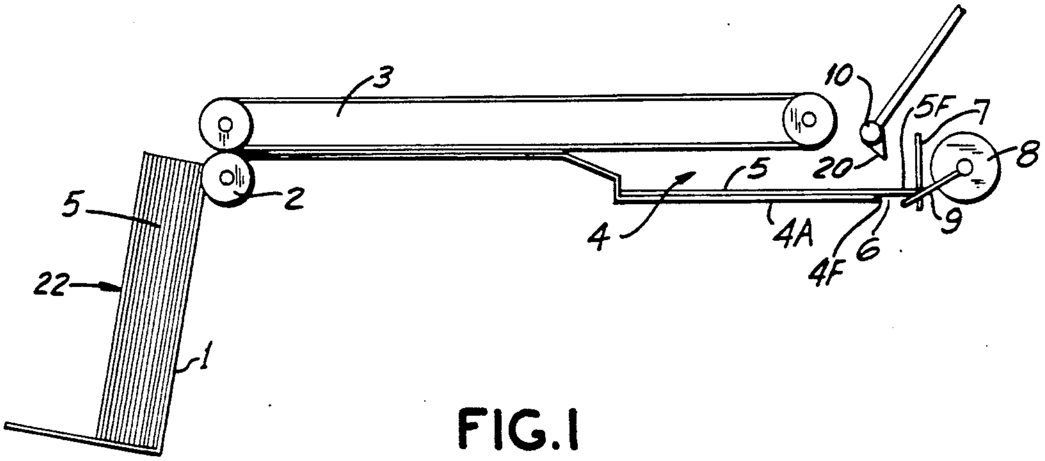
FIG. 1 is a schematic side elevational view showing a feeding and assemblying mechanism made in accordance with the present invention.

Referring to FIG. 1, the feed hopper 1 holds the documents to be processed which are shown as being a plurality of sheets 5 in a stack 22. As shown in the drawings, the stack 22 and feed hopper 1 are shown in a generally vertical orientation. However, it will be understood that the feed hopper 1 and the stack 22 may be positioned in a different orientation, if desired, without departing from the invention. Vacuum drum 2 and vacuum conveyor 3 or some other similar mechanism, receive and transport the individual sheets 5 from the feed hopper 1 to an accumulator station 4 for the assembly of sets of sheets 5 into booklets.

The accumulator station 4 comprises a base plate 4A having a front edge 4F. The base plate 4A is shorter than sheets 5 to form an open area 6 over which the front ends 5F hang. A backstop 7 is also provided in front of and spaced from the front edge 4F of the base plate 4A of the accumulator station 4 by the space 6 against which the front ends 5F of the sheets 5 abut.

A rotary solenoid 8, or some other similar mechanism, has at least one finger 9 extending therefrom, is positioned in front of the backstop 7 over or in the space 6 and below the plane of the base plate 4A. A glue applicator system 10 has dispensing nozzle 20 positioned in the area above the space 6. When the solenoid 8 is activated the finger 9 first moves upwardly in a clockwise direction and after it has finished its upward stroke, the solenoid reverses to that finger 9 moves downwardly in a counter-clockwise direction.

Figure 2:
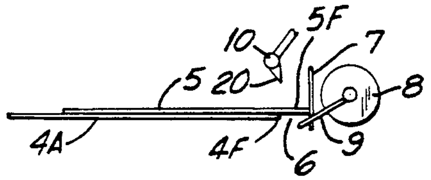
FIGS. 2 to 9 are schematic side elevational views similar to FIG. 1 showing the various steps in the operation of mechanism embodying the present invention.
Figure 3:
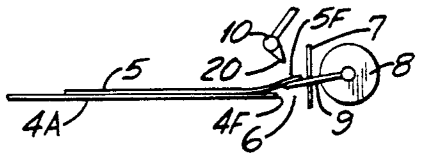

As shown in FIG. 1, first document 5 is shown in the operative start position with the document 5 resting against the backstop 7 with its front end 5F overlying the space 6 and being above the finger 9 of the solenoid 8. FIG. 2 shows the starting condition and represents the first step of the glue application cycle. As soon as the document 5 has reached the position as shown in FIG. 2 with its front end 5F against the backstop 7, sensing means (not shown), which may be optical, detects the presence of the sheet 5 in the proper position. The solenoid 8 with finger 9 begins to rotate in clockwise direction, sticks the lower face of the sheet 5 and starts to lift the forward end 5F of the document 5 upwardly as shown in FIG. 3.

Figure 4:
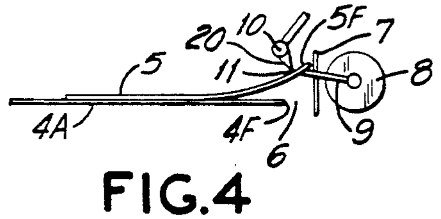

The means sensing the presence of the sheet 5 at the glue position are working in conjunction with the glue applicator system 10 which is triggered to release a small quantity of glue to its glue applicator head 20. As shown in FIG. 4, the finger 9 of solenoid 8 continues to lift the front end 5F of the sheet 5 until the front end 5F makes actual contact with the glue applicator head 20. At this point, a small quantity of glue 11 is deposited on the front end 5F of the sheet 5.

Figure 5:
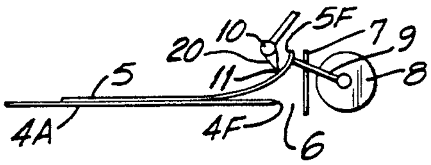
Figure 6:
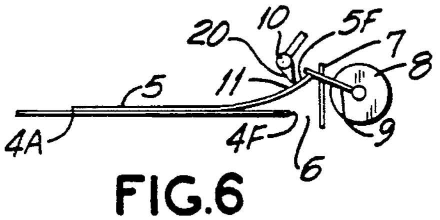
Figure 7:
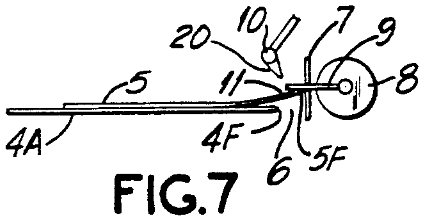

As shown in FIG. 5, solenoid 8 causes the finger 9 to continue to rotate in a clockwise direction thereby curving the sheet 5 upwardly to an extent that the finger 9 moves beyond the front end 5F of the sheet 5 and loses lift contact with the sheet 5 as shown in FIG. 6. Once this has occurred, the solenoid 8 is actuated to reverse its rotary direction and to rotate counter-clockwise so that the finger 9 now moves downwardly in a counter-clockwise direction. The finger 9 moving downwardly in a counter-clockwise direction strikes the upper face of the sheet 5 and pushes the front end 5F of the sheet 5 downwardly. The glue spot 11 picked up from the nozzle head 20 of the glue application system 10 remains on the front end 5F of the sheet 5 as shown in FIG. 7.

Figure 8:
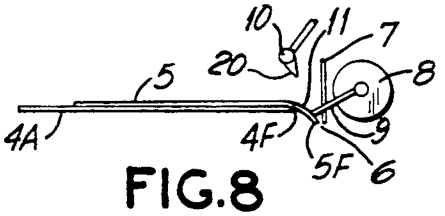
Figure 9:
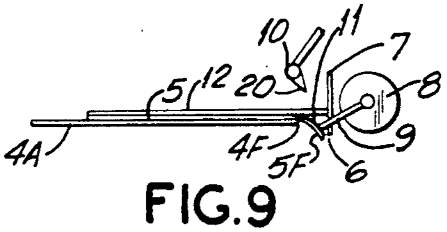

In FIG. 8, the rotary solenoid 8 and its finger 9 are returning to the starting position thereby bending the leading end 5F of the sheet 5 downwardly around the front edge 4F of the tray base plate 4 in preparation for the arrival of the next sheet 12 as shown in FIG. 9. The operational cycle for the solenoid 8 and its finger 9 are ready to repeat the upward lift of the second sheet 12 to the glue nozzle 20. When traveling in its downward motion it will push the second sheet 12 downward and on top of the first sheet 5 so that sheets 5 and 12 are pressed downward with the glue dot 11 now bonding page 5 to page 12. This cycle is repeated until a booklet with a plurality of bonded sheets 5–12 is completed.

It should be noted that the position of the starting point of the finger 9 of the solenoid 8 is important. After the first sheet 5 has received its glue spot 11 and is returned to the horizontal position with its leading edge 5F being deflected downward below the base plate 4 (which is the feeding plane of the next sheet of paper 12), the glue spot 11 has been also moved below the base plate 4 of the feeding plane. This permits the next page 12 to enter the accumulator 4 without any glue 11 from previous sheet 5 being picked up by sheet 12 and thus is prevented from being transferred to any other sheet or any other part of the mechanism. Thus, the system does not soil surrounding equipment components which otherwise would lead to jams due to the increased friction due to dragged out glue residues.

It should also be noted that when the finger 9 is moving sheet 5 (or any subsequent sheets) downwardly, as shown in FIGS. 8 and 9, the finger 9 does not move beyond the front edge 5F of the sheet 5. On the contrary, in order to prevent the front end 5F of sheet 5 from snapping upwardly, finger 9 holds the front edge 5F of sheet 5 down below the plane of the plate 4A until the next sheet 12 is in the proper initial position on the plane of plate 4A.

The present invention may be employed for the assembly of small documents, i.e., check size documents, as well as much larger documents, i.e., letters or even larger documents. The advantage of this glue system is the ability to maintain a clean environment and utilize accumulator stations as efficiently as if there are no glue applications involved.

This glue system may also be installed in other applications where the high speed dabbing of glue onto a sheet of paper or other material is required. Such applications may be found in the graphic arts industry or in the preparation of mailing pieces, etc. This development could also be installed into envelope stuffing and mailing systems in order to apply glue to the horizontal glue flaps.

It will thus be seen that the present invention provides an improved mechanism for assembling and adhering a plurality of sheets together at high speeds to form a booklet or similar article in which each sheet has adhesive applied to it individually in which the adhesive is confined to the sheet to which it is applied so that there is no danger of glue being smeared to other sheets or to other parts of the mechanism.

The embodiments of the invention in which an exclusive property or privilege is claimed are defined as follows:

1. A method of assembling a plurality of sheets together which comprises applying adhesive to a first sheet from an adhesive applying means, moving at least a portion of the sheet in one direction from an initial first position to a second position adjacent the adhesive applying means, depositing adhesive on the same portion of the sheet when the sheet reaches the second position, moving at least the same portion of the sheet with the adhesive thereon away from the adhesive applying means in an opposite direction to said one direction to a third position beyond said initial first position, depositing a second sheet over the first sheet after the first sheet is moved to said third position beyond said initial position, moving said second sheet into contact with the adhesive on the first sheet to adhere the two sheets together, said second sheet being moved from an initial position in one direction to have adhesive applied thereon and in an opposite direction after adhesive application beyond said initial position of said second sheet, moving a plurality of sheets individually and successively first in one direction to have adhesive applied to each and then in the opposite direction into contact with the previous sheet so as to be adhered to the previous sheet, one face of a front end of the sheet being engaged to move it in one direction and thereafter an opposite face of the same sheet is engaged to move it in the opposite direction.

2. The method as claimed in claim 1 wherein said sheet is held in a position beyond an initial position when moved in the opposite direction until another sheet is deposited over the said sheet.

* * * * *